United States Patent
Lee et al.

(10) Patent No.: US 10,348,835 B2
(45) Date of Patent: Jul. 9, 2019

(54) SLAVE DEVICE AND METHOD FOR CONTROLLING THE SAME

(71) Applicant: LSIS CO., LTD., Gyeonggi-do (KR)

(72) Inventors: Ji-Geon Lee, Gyeonggi-do (KR); Dae-Hyun Kwon, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 379 days.

(21) Appl. No.: 15/130,548

(22) Filed: Apr. 15, 2016

(65) Prior Publication Data
US 2016/0308973 A1 Oct. 20, 2016

(30) Foreign Application Priority Data

Apr. 17, 2015 (KR) .................. 10-2015-0054788

(51) Int. Cl.
*H04L 29/08* (2006.01)
*H04L 12/26* (2006.01)
(Continued)

(52) U.S. Cl.
CPC .......... *H04L 67/125* (2013.01); *H04L 12/437* (2013.01); *H04L 41/0893* (2013.01);
(Continued)

(58) Field of Classification Search
CPC . H04L 67/125; H04L 67/1044; H04L 12/437; H04L 41/0893; H04L 43/10; H04L 43/0817
See application file for complete search history.

(56) References Cited

U.S. PATENT DOCUMENTS 8,072,999 B1* 12/2011 Cline .................. H04L 12/437
370/431
8,578,077 B2 11/2013 Beyer
(Continued)

FOREIGN PATENT DOCUMENTS

CN 101770444 A 7/2010
JP H10-161952 A 6/1998
(Continued)

OTHER PUBLICATIONS

Japanese Office Action dated May 23, 2017 in connection with the counterpart Japanese Patent Application.
(Continued)

*Primary Examiner* — Blake J Rubin
(74) *Attorney, Agent, or Firm* — K&L Gates LLP (57) ABSTRACT

Disclosed herein are embodiments of a method for controlling a slave device in a system including a master device and a plurality of groups of slave devices. In one embodiment, the method includes generating, by the master device, a control message containing group data items each corresponding to the respective groups to transmit the control message to a particular group; transmitting, by a slave device included in the particular group, the control message to a next group; extracting, by the slave device, a group data item from the control message after the transmitting the control message; extracting/writing, by the slave device, data from/onto the group data; and transmitting, by the slave device, the group data to the master device after completing the extracting/writing.

4 Claims, 6 Drawing Sheets

(51) Int. Cl.
*H04L 12/437* (2006.01)
*H04L 12/24* (2006.01)

(52) U.S. Cl.
CPC .......... *H04L 43/10* (2013.01); *H04L 67/1044* (2013.01); *H04L 43/0817* (2013.01)

(56) References Cited

U.S. PATENT DOCUMENTS

| | | | | |
|---|---|---|---|---|
| 9,130,773 | B2* | 9/2015 | Buttner | H04L 12/403 |
| 2009/0180483 | A1 | 7/2009 | Przybylski | |
| 2010/0138033 | A1* | 6/2010 | Muller | B65H 39/02 |
| | | | | 700/218 |
| 2011/0029687 | A1* | 2/2011 | Kirrmann | H04L 12/437 |
| | | | | 709/236 |
| 2011/0184533 | A1* | 7/2011 | Maruyama | G05B 19/4185 |
| | | | | 700/3 |
| 2011/0205886 | A1* | 8/2011 | Maruyama | H04L 12/40176 |
| | | | | 370/225 |
| 2011/0267854 | A1* | 11/2011 | Flannery | H02M 7/493 |
| | | | | 363/72 |
| 2012/0041599 | A1* | 2/2012 | Townsend | B25J 3/04 |
| | | | | 700/275 |
| 2013/0173868 | A1* | 7/2013 | Leyrer | G06F 12/1483 |
| | | | | 711/152 |
| 2014/0047056 | A1* | 2/2014 | Tahara | H04L 69/40 |
| | | | | 709/208 |
| 2014/0115190 | A1 | 4/2014 | Przybylski | |
| 2014/0226459 | A1* | 8/2014 | Edmiston | H04J 3/0641 |
| | | | | 370/216 |
| 2014/0233372 | A1* | 8/2014 | Edmiston | H04L 12/40019 |
| | | | | 370/225 |
| 2015/0058432 | A1* | 2/2015 | Mizutani | G05B 19/05 |
| | | | | 709/208 |
| 2015/0134199 | A1* | 5/2015 | Fraser-Chanpong | B60W 10/00 |
| | | | | 701/36 |
| 2015/0248126 | A1* | 9/2015 | Oh | G05B 19/418 |
| | | | | 700/3 |
| 2015/0295727 | A1* | 10/2015 | Bunte | H04L 12/1854 |
| | | | | 370/390 |
| 2016/0124412 | A1* | 5/2016 | Fujita | H04L 12/40019 |
| | | | | 700/3 |
| 2016/0344653 | A1* | 11/2016 | Kiribuchi | H04L 12/403 |
| 2017/0099158 | A1* | 4/2017 | Mizutani | H04L 12/423 |
| 2017/0163440 | A1* | 6/2017 | Borkhuis | H04L 12/40176 |
| 2017/0171096 | A1* | 6/2017 | Bunte | H04L 47/625 |
| 2017/0251059 | A1* | 8/2017 | Sawada | H04L 41/12 |

FOREIGN PATENT DOCUMENTS

| | | |
|---|---|---|
| JP | 2003-196230 A | 7/2003 |
| JP | 2006-107022 A | 4/2006 |
| JP | 2006-332787 A | 7/2006 |
| JP | 2006-348649 A | 12/2006 |
| JP | 2006332787 A | 12/2006 |
| JP | 2010-062855 A | 3/2010 |
| JP | 2010062855 A | 3/2010 |
| KR | 10-1257153 B1 | 4/2013 |
| WO | 2009088574 A1 | 7/2009 |

OTHER PUBLICATIONS

European Search Report for Application No. 16162599.1 dated Jul. 12, 2016 in 12 pages.
S. Shah & M. Yip, Exterme Networks' Ethernet Automatic Protection Switching (EAPS), Version 1, dated Jan. 10, 2003 in 7 pages.

* cited by examiner

SLAVE DEVICE AND METHOD FOR CONTROLLING THE SAME

CROSS-REFERENCE TO RELATED APPLICATIONS

This application claims the priority of Korean Patent Application No. KR 10-2015-0054788 filed on Apr. 17, 2015, in the Korean Intellectual Property Office, which is incorporated by reference in its entirety.

BACKGROUND

Technical Field

The present disclosure relates to a slave device and a method for controlling the same.

Description of the Related Art

Typically, in a network with a number of devices connected thereto, the devices may be divided into a master device and slave devices. The master device monitors operation of slave devices or transmits instructions or data required by the slave devices. In general, when a network includes a large number of slave devices, a master device transmits a control message to each of the slave devices to control them.

Figure 1:
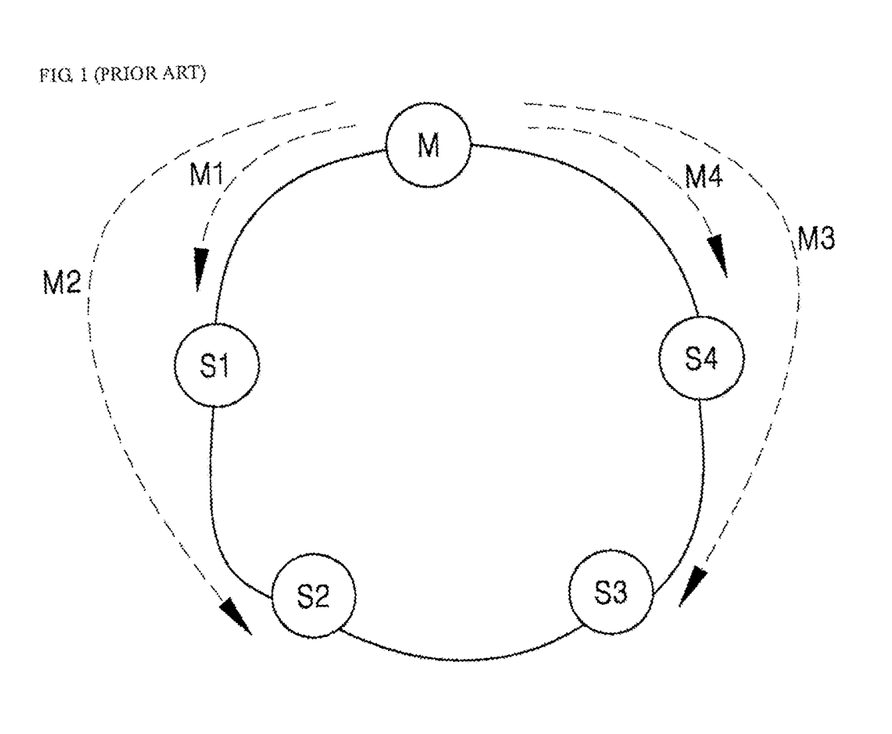
FIG. 1 is a diagram illustrating a data transmission scheme between a master device and slave devices in the related art.

FIG. 1 is a diagram illustrating a data transmission scheme between a master device and slave devices in the related art. Referring to FIG. 1, a master device M generates as many control messages as slave devices existing in the network. Then, the master device M transmits the generated control messages to the slave devices S1 to S4, respectively. The slave devices S1 to S4 apply there to the received control messages from the master device M or transmit input data to the master device M as requested.

In doing so, in order to control the slave devices S1 to S4, the master device M has to generate as many control messages as the slave devices S1 to S4 in the network and transmits them to the slave devices S1 to S4, respectively.

However, according to this scheme, there is a problem in that data traffic increases as the number of slave devices increases and in turn the number of control messages increases. As a result, data transmission time increases and thus it becomes difficult to control the slave devices in real-time.

To overcome this problem, there has been proposed a data transmission scheme using the EtherCAT communications.

Figure 2:
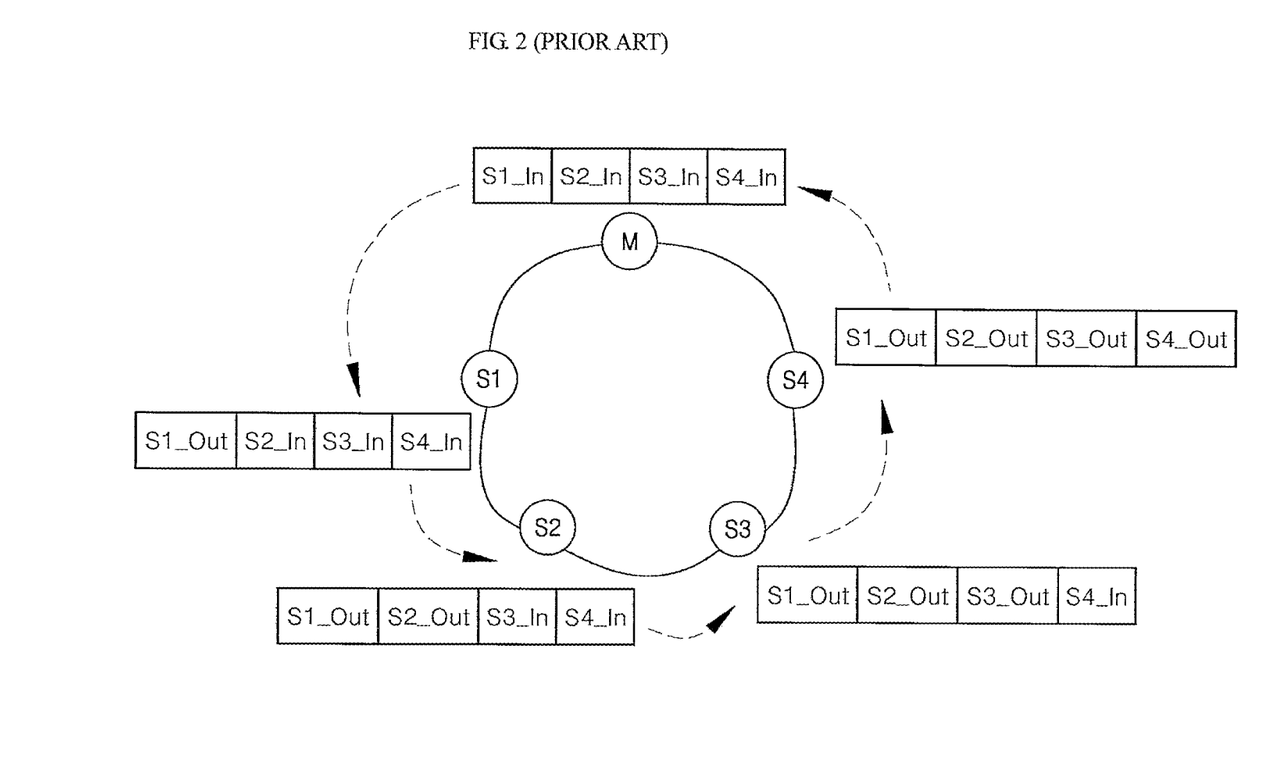
FIG. 2 is a diagram illustrating a data transmission scheme using the EtherCAT communications in the related art.

FIG. 2 is a diagram illustrating a data transmission scheme using the EtherCAT communications in the related art. Referring to FIG. 2, in order to control slave devices S1 to S4 in a network, a master device M packages output data items S1_In, S2_In, S3_In and S4_In each having a fixed size into a single control message to transmit it to the slave devices S1 to S4, respectively. Then, the master device M transmits the generated control message to the slave device S1.

In the EtherCAT communications architecture shown in FIG. 2, the slave device. S1 transmits the control message received from the master device M to the slave device S2 in a cut-through manner, and likewise the slave device S2 transmits the received control message to the slave device S3, and so on. The cut-through manner refers to a technique that a received message is transmitted as soon as the destination of the message is determined to thereby reduce standby time of the message.

Initially, the slave device S1 receives a control message from the master device M, and extracts input data S1_In from the first field of the control message that is associated with the slave device S1. Subsequently, the slave device S1 writes output data S1_Out in the first field of the control message to transmit it to the slave device S2.

The slave device S2, upon receiving the control message from the slave device S1, extracts input data S2_In from the second field of the control message that is associated with the slave device S2. Then, the slave device S2 writes output data S2_Out in the second field of the control message to transmit it to the slave device S3.

The slave device S3, upon receiving the control message from the slave device S2, extracts input data S3_In from the third field of the control message that is associated with the slave device S3 to apply it thereto. Then, the slave device S3 writes output data S3_Out in the third field of the control message to transmit it to the slave device S4.

The slave device S4, upon receiving the control message from the slave device S3, extracts input data S4_In from the fourth field of the control message that is associated with the slave device S4 to apply it thereto. Then, the slave device S4 writes output data S4_Out in the fourth field of the control message to transmit it to the master device M.

The master device M may determine whether the slave devices S1 to S4 are operating normally based on the output data S1_Out, S2_Out, S3_Out and S4_Out, respectively, included in the received control message from the slave device S4.

According to the data transmission scheme using the EtherCAT communications as described above with referring to FIG. 2, the master device M only has to generate a single control message regardless of the number of the slave devices S1 to S4. Therefore, the problem of the scheme described above with reference to FIG. 1, i.e., increase in data traffic can be addressed. Further, according to the data transmission scheme using the EtherCAT communications as described above with referring to FIG. 2, the data transmission time can be reduced via the hardware switching manner, i.e., the cut-through manner.

Unfortunately, the slave devices S1 to S4 cannot transmit other control messages while a control message is transmitted therebetween, in order to avoid data collision.

In addition, the control message generated by the master device M has fields of fixed sizes in which input data of each of the slave devices S1 to S4 is stored, such that the size of data to be transmitted is limited. Further, for a network including a larger number of slave devices, the size of the data fields allocated to each of the slave devices decreases.

Furthermore, as the number of the slave devices increases, the transmission delay of the control message increases linearly, such that it becomes difficult to control the slave devices in real-time.

SUMMARY

It is an aspect of some embodiments of the present disclosure to provide a method for controlling a slave device in which slave devices are grouped, and a master device transmits a control message containing group data items, so that data traffic can be reduced even if the number of the slave devices increases.

It is another aspect of some embodiments of the present disclosure to provide a method for controlling a slave device in which a slave device in a group transmits a control message transmitted from a master device to a next device via cut-through switching manner, so that data traffic can be reduced.

It is yet another aspect of some embodiments of the present disclosure to provide a method for controlling a slave device in which the size of data transmitted from a slave device to a master device can vary as required.

It should be noted that objects of the present disclosure are not limited to the above-described objects, and other objects of the present disclosure will be apparent to those skilled in the art from the following descriptions.

In accordance with one aspect of some embodiments of the present disclosure, a method for controlling a slave device in a system comprising a master device and a plurality of groups of slave devices includes: generating, by the master device, a control message containing group data items each corresponding to the respective groups to transmit the control message to a particular group; transmitting, by a slave device included in the particular group, the control message to a next group; extracting, by the slave device, a group data item from the control message after the transmitting the control message; extracting/writing, by the slave device, data from/onto the group data; and transmitting, by the slave device, the group data to the master device after completing the extracting/writing.

In accordance with another aspect of some embodiments of the present disclosure, a slave device in a system comprising a master device and a plurality of groups of slave devices includes: a receiving port configured to receive a control message containing group data items each corresponding to the respective groups or the group data items; a transmitting port configured to transmit the control message or the group data items to another device; and a data processing unit configured to extract the group data items from the control message, to extract input data from the group data items, and to write output data onto the group data items, wherein the transmitting port transmits the control message to a next group before the data processing unit extracts the group data items from the control message.

The above described and other features are exemplified by the detailed description and accompanying drawings.

Advantages and features of the present disclosure and methods to achieve them will become apparent from the descriptions of embodiments herein below with reference to the accompanying drawings. However, the present disclosure is not limited to embodiments disclosed herein but may be implemented in various different ways. The embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions.

According to an embodiment of the present disclosure, slave devices are grouped, and a master device transmits a control message containing group data items, so that data traffic can be reduced even if the number of the slave devices increases.

According to another embodiment of the present disclosure, a slave device in a group transmits a control message transmitted from a master device to a next group via cut-through switching manner, so that data traffic can be reduced.

In addition, according to an embodiment of the present disclosure, the size of data transmitted from a slave device to a master device can vary as required.

DETAILED DESCRIPTION

Hereinafter, embodiments of the present disclosure will be described in detail with reference to the accompanying drawings.

Figure 3:
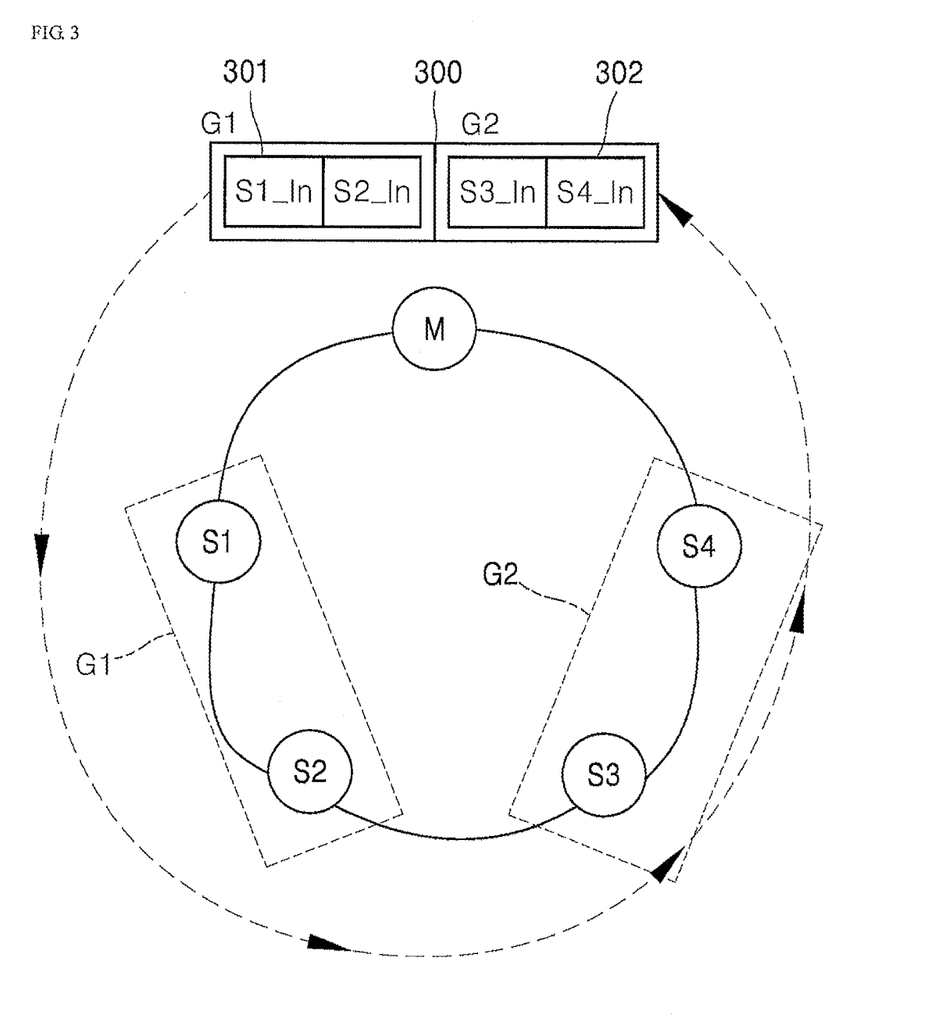
FIGS. 3 and 4 are diagrams illustrating a data transmission method between a master device and slave devices according to an embodiment of the present disclosure.

FIG. 3 is a diagram illustrating a data transmission method between a master device and slave devices according to an embodiment of the present disclosure.

Referring to FIG. 3, a master device M is connected to a number of slave devices 200 existing in a network, and transmits input data items S1_In, S2_In, S3_In and S4_In contained in a control message 300 to the slave devices S1 to S4, respectively. In addition, the master device M may determine whether the slave devices S1 to S4 are operating normally based on the output data items S1_Out, S2_Out, S3_Out and S4_Out written onto the control message by the slave devices S1 to S4, respectively.

It is to be noted that according to the embodiment, the slave devices S1 to S4 are grouped into a plurality of groups G1 and G2 as shown in FIG. 3. In FIG. 3, the first group G1 includes slave devices S1 and S2, and the second group G2 includes slave devices S3 and S4. Although four slave devices are grouped into two groups in the embodiment shown in FIGS. 3 and 4 for convenience of illustration, different numbers of slave devices may be grouped into different numbers of groups in other embodiments. For example, according to an embodiment of the present disclosure, six slave devices may be grouped into two groups each including three devices, or into three groups each including two devices.

Accordingly, the master device M generates a control message 300 including first group data 301 and second group data 302. The first group data 301 contains input data items S1_in and S2_In to be transmitted to the slave devices S1 and S2, respectively, belonging to the first group G1 The second group data 302 contains input data items S3_In and S4_In to be transmitted to the slave devices S3 and S4, respectively, belonging to the second group G2. The master device M packages the first group data 301 and the second group data 302 into the control message 300 and transmit the generated control message 300 to the first group G1.

Figure 4:
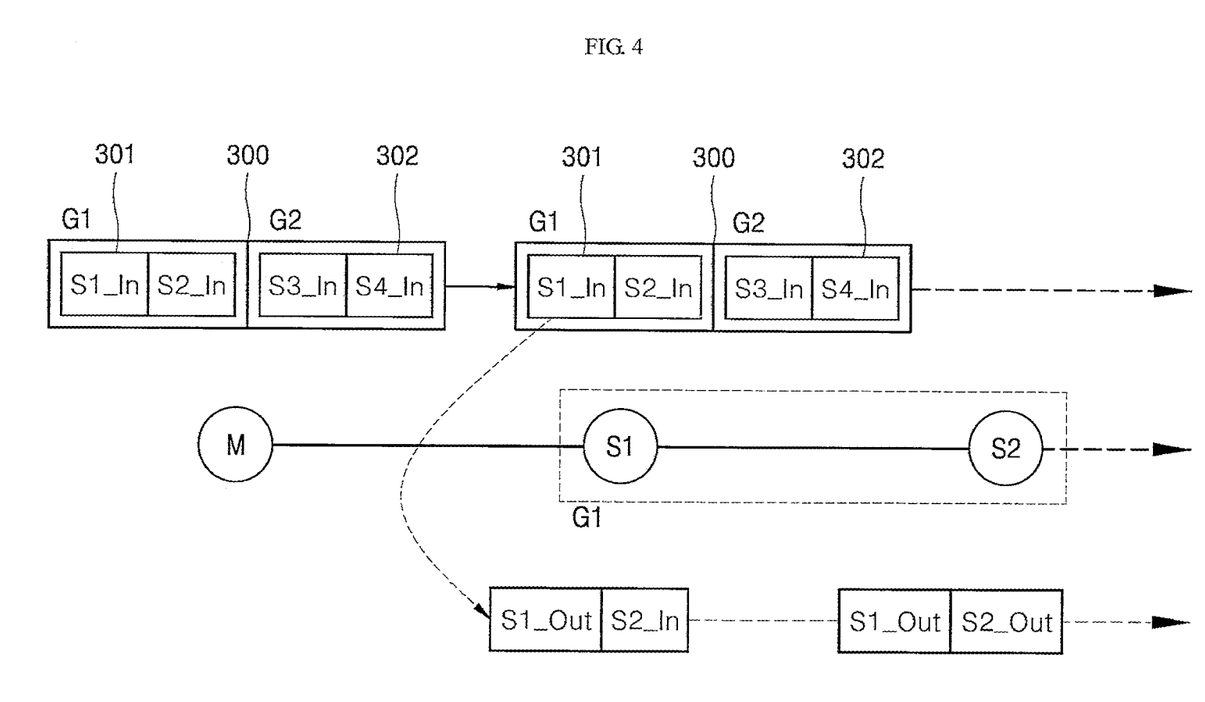

Referring to FIG. 4, the slave device S1 of the first group G1 receives the control message 300 from the master device M. Then, the slave device S1 may receive the control message 300, wait for a standby time, and transmit the control message 300 to the next group G2. That is, according to the embodiment of the present disclosure, after the groups G1 and G2 receive the control message 300, they transmit the control message 300 to the next group immediately before extracting the group data 301 and 302 from the control message 300, rather than transmitting the control message 300 to the next group after performing data processing (e.g., extracting input data or writing output data).

In other words, according to the embodiment of the present disclosure, the groups transmit the control message 300 to the next group as soon as they receive the control message 300. Then, after the transmission of the control message 300 is completed, group data are extracted, input data items are extracted and output data items are written, which will be described below. Accordingly, it takes less time for the groups G1 and G2 to receive the control message 300, and thus increase in data traffic can be reduced even with more slave devices.

On the other hand, according to another embodiment of the present disclosure, the slave device S1 of the first group G1 may receive the control message 300, extract first group data 301 from the control message 300 and immediately transmit the control message 300 to the second group G2.

The slave device S1 may extract an input data item S1_In from the first group data 301 extract from the control message 300. Then, the slave device S1 generates an output data item S1_Out at a predetermined data size for transmission to the master device M and writes it onto the first group data 301. That is, according to the embodiment of the present disclosure, the size of the output data item S1_Out may vary depending on a predetermined size, unlike in the related art. Then, the slave device S1 transmits the first group data 301 in which the output data S1_Out is written to the slave device S2 of the same group G1.

The slave device S2 receives the first group data 301 from the slave device S1 and extracts an input data item S2_In therefrom. Then, the slave device S2 generates an output data item S2_Out at a predetermined data size for transmission to the master device M and writes it onto the first group data 301. Then, the slave device S2 sets the destination address of the first group data 301 to the address of the master device M and transmits the first group data 301 to the master device M. The first group data 301 transmitted by the slave device S2 may be transmitted to the master device M via the second group G2 or may be transmitted directly to the master device M.

In addition, according to yet another embodiment of the present disclosure, the slave device S4 of the second group G2 may receive the control message 300, extract second group data 302 from the control message 300 and then immediately transmit the control message 300 to the first group G1.

The slave device S4 may extract an input data item S4_In from the second group data 302 extract from the control message 300, and then may generate an output data S4_Out for transmission to the master device M at a predetermined data size to write it onto the second group data 302. That is, according to the embodiment of the present disclosure, the size of the output data item S4_Out may vary depending on a predetermined size, unlike in the related art. Then, the slave device S4 may transmit the second group data 302 in which the output data S4_Out is written to the next slave device S3 of the same group G2.

The slave device S3 may receive the second group data 302 from the slave device S4 to extract an input data item S3_In, and then may generate an output data S3_Out for transmission to the master device M at a predetermined data size to write it onto the second group data 302. Then, the slave device S3 sets the destination address of the second group data 302 to the address of the master device M and transmits the second group data 302 to the master device M. The second group data 302 transmitted by the slave device S3 may be transmitted to the master device M via the first group G1 or may be transmitted directly to the master device M.

The control message 300 undergoes the same processing and transmission in the second group. The slave device S3 of the second group G2 extracts the second group data 302 from the control message 300 transmitted via the first group G1.

The slave device S3 extracts the input data item S3_In from the second group data 302, and generates the output data item S3_Out at a predetermined data size to write it onto the second group data 302. Then, the slave device S3 transmits the second group data 302 in which the output data S3_Out is written to the slave device S4 of the same group G2.

The slave device S4 receives an input data item S4_In from the second group data 302 received from the slave device S3. Then, the slave device S4 generates an output data item S4_Out at a predetermined data size for transmission to the master device M and writes it onto the second group data 302. Then, the slave device S4 sets the destination address of the second group data 302 to the address of the master device M and transmits the second group data 302 to the master device M.

The master device M may determine whether the slave devices S1 to S4 are operating normally based on the output data item S1_Out, S2_Out, S3_Out and S4_Out written in the group data 301 and the group data 302 transmitted from the groups G1 and G2.

As described above, according to the embodiment of the present disclosure, the process of responding by the slave devices S1 to S4 to the master device M, e.g., writing the output data items and transmitting the group data are performed at the group level. Accordingly, it takes less time to transmit data and it is possible to control the slave devices faster than in the related art in which slave devices response individually.

Figure 5:
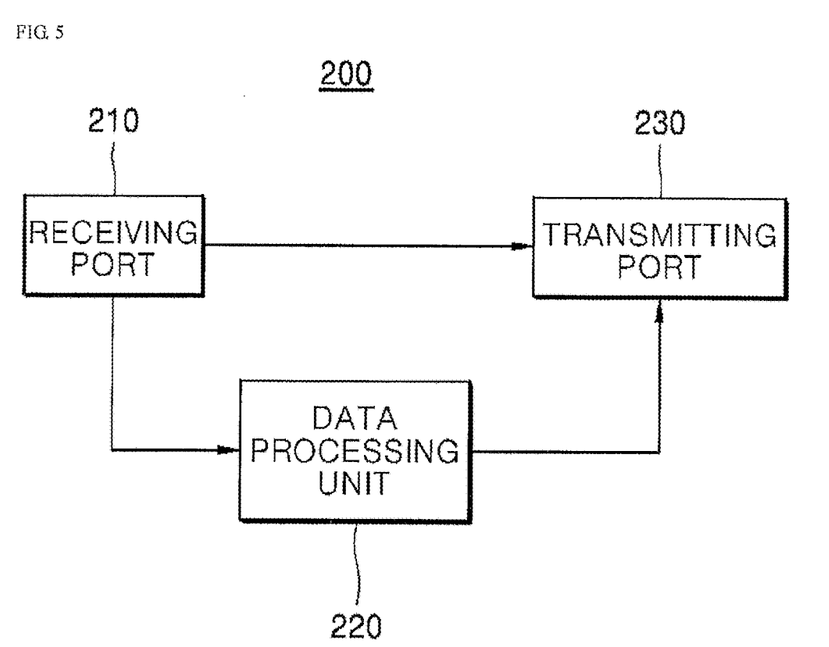
FIG. 5 is a block diagram for illustrating a configuration of a slave device according to an embodiment of the present disclosure.

FIG. 5 is a block diagram for illustrating a configuration of a slave device according to an embodiment of the present disclosure.

Referring to FIG. 5, a slave device 200 includes a receiving port 210, a transmitting port 220 and a data processing unit 230.

The receiving port 210 receives a control message or group data corresponding to each of a plurality of groups. That is, the receiving port 210 may receive a control message containing group data transmitted from a master device or may receive group data transmitted from another slave device in the same group.

The transmitting port 220 transmits the control message or the group data to another device. That is, the transmitting port 220 may transmit the control message transmitted from the master device or another group to the next group or may transmit the group data to another slave device in the same group.

According to an embodiment of the present disclosure, the transmitting port 220 may transmit the control message to the next group before the data processing unit 230 extracts the group data from the control message. According to another embodiment of the present disclosure, the transmitting port 220 may transmit the control message to the next group immediately after the data processing unit 230 extracts the group data from the control message.

The data processing unit 230 extracts group data from the control message received from the receiving port 210, extracts input data from the extracted group data, and writes output data onto the control message. The size of the output data may vary depending on a predetermined data size.

Figure 6:
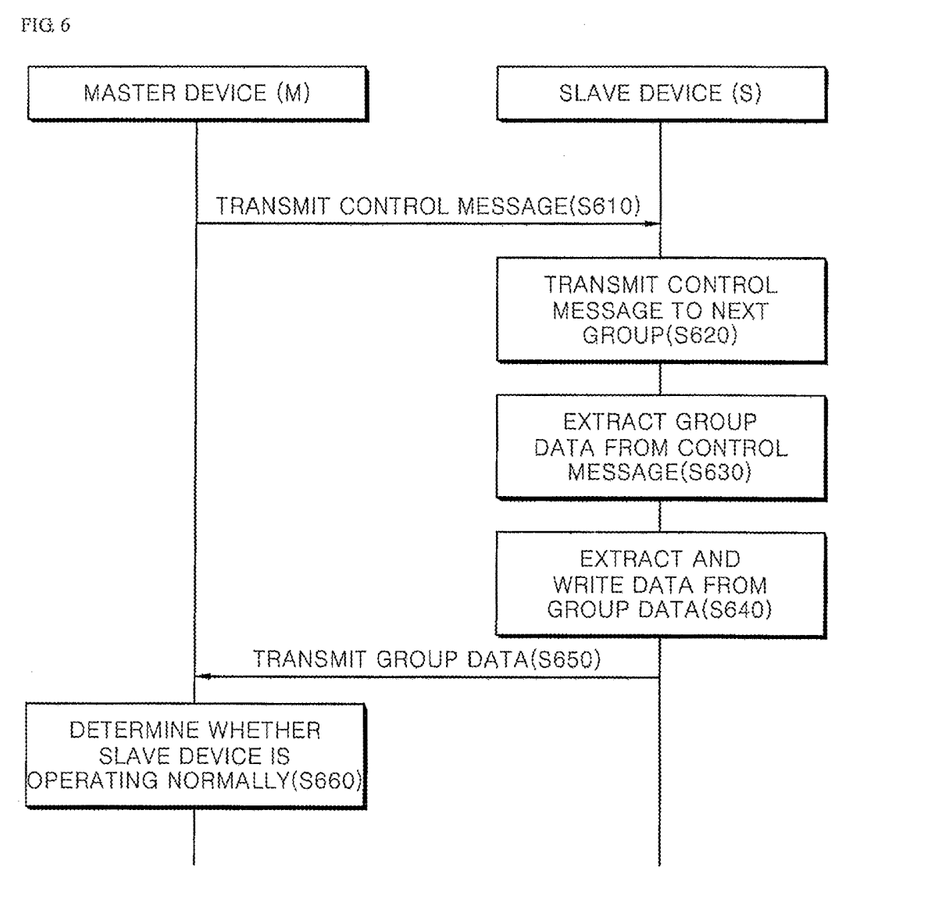
FIG. 6 is a message sequence chart illustrating a data transmission method between a master device and slave devices according to an embodiment of the present disclosure.

FIG. 6 is a message sequence chart illustrating a data transmission method between a master device and slave devices according to an embodiment of the present disclosure.

Referring to FIG. 6, a master device M generates a control message containing group data corresponding to each of a plurality of groups, and transmits the control message to a particular group among the plurality of groups (step S610).

A slave device belonging to the particular group transmits the control message to the next group (step S620).

After transmitting the control message to the next group, the slave device included in the particular group extracts group data from the control message (step S630).

Subsequently, the slave device included in the particular group extracts/writes data from/to the group data (step S640). In an example of step S640, the slave device included in the particular group may extract input data from the group data while writing output data onto the group data simultaneously. The size of the output data may vary depending on a predetermined data size.

The slave device included in the particular group transmits the group data to the master device M after completing extracting and writing data (step S650).

The master device M determines whether the slave device included in the particular group is operating normally based on the output data contained in the group data (step S660).

Thus far, although specific embodiments of the present disclosure have been described, various modifications may be made without departing from the scope of the present disclosure. Accordingly, the scope of the present disclosure is not construed as being limited to the above-described embodiments, but is defined solely by the following claims as well as equivalents thereof.

Although the present disclosure has been described with reference to the embodiments and the accompanying drawings, it is not limited to the above-described embodiments, but may be variously modified and altered from the above description by those skilled in the art. Therefore, the scope and spirit of the present disclosure should be defined only by the following claims, and all of the equivalences and equivalent modifications of the claims should be intended to fall within the scope and spirit of the present disclosure.

What is claimed is:

1. A method for controlling a slave device in an Ethernet for Control Automation Technology (EtherCAT) system comprising a master device and a plurality of groups of slave devices, the method comprising:
   generating, by a master device, a control message containing group data items, each corresponding to respective groups to transmit the control message to a particular group;
   transmitting, by a slave device included in the particular group, the control message to a next group;
   extracting, by the slave device, a group data item from the control message after transmitting the control message to the next group;
   extracting, by the slave device, input data from the group data item;
   writing, by the slave device, output data onto the group data item; and
   transmitting, by the slave device, the group data item to the master device after completing the extracting the input data and the writing the output data,
   wherein the slave device included in the particular group extracts input data from the group data item of the control message while writing output data onto the group data item of the control message simultaneously,
   wherein the slave device generates an output data item at a predetermined data size for transmission to the master device and writes the output data item onto the group data, and writes a destination address of the group data to an address of the master device and transmits the group data to the master device,
   wherein a size of the output data varies depending on a predetermined data size, and
   wherein the group data transmitted by the slave device is transmitted to the master device via a slave device of a next group or transmitted directly to the master device.

2. The method of claim 1, further comprising:
   determining, by the master device, whether the slave devices included in a plurality of groups are operating normally based on the output data contained in the group data items transmitted from the plurality of groups.

3. A slave device in an Ethernet for Control Automation Technology (EtherCAT) system comprising a master device and a plurality of groups of slave devices, the slave device comprising:
   a receiving port configured to receive a control message containing group data transmitted from a master device or to receive group data transmitted from another slave device in the same group of slave devices, wherein each group data contains group data items, and wherein each group data item of a group data corresponds to a respective slave device;
   a data processing unit configured to extract the group data items from the control message, to extract input data from the group data items, and to write output data onto the group data items, wherein the data processing unit included in a particular group extracts input data from the group data of the control message while writing output data onto the group data of the control message simultaneously, and wherein a size of the output data varies depending on a predetermined data size; and
   a transmitting port configured to transmit the control message transmitted from the master device or another group to a next group or to transmit the group data to another slave device in the same group before the data processing unit extracts the group data items from the control message,
   wherein the data processing unit generates an output data item at a predetermined data size for transmission to the master device and writes the output data item onto the group data, and writes a destination address of the group data to an address of the master device and transmits the group data to the master device, and
   wherein the group data transmitted by the data processing unit is transmitted to the master device via a slave device of a next group or transmitted directly to the master device.

4. The slave device of claim 3, further comprising:
   a master device configured to determine whether slave devices included in a plurality of groups are operating normally based on the output data contained in the group data items transmitted from the plurality of groups.

* * * * *